United States Patent [19]

Harwood et al.

[11] Patent Number: 4,616,254

[45] Date of Patent: Oct. 7, 1986

[54] HANGING DOT REDUCTION SYSTEM

[75] Inventors: Leopold A. Harwood, Bridgewater; Kirk A. Law, East Windsor, both of N.J.

[73] Assignee: RCA Corporation, Princeton, N.J.

[21] Appl. No.: 724,647

[22] Filed: Apr. 18, 1985

[51] Int. Cl.[4] ............................................. H04N 9/64
[52] U.S. Cl. ....................................... 358/31; 358/36
[58] Field of Search ...................... 358/31, 36, 37, 329

[56] References Cited

U.S. PATENT DOCUMENTS

| | | | |
|---|---|---|---|
| 4,050,084 | 9/1977 | Rossi | 358/31 |
| 4,072,984 | 2/1978 | Kaiser | 358/31 |
| 4,167,021 | 9/1979 | Holmes | 358/36 |
| 4,178,609 | 12/1979 | Beutel | 358/31 |
| 4,241,363 | 12/1980 | Maeyama et al. | 358/36 |
| 4,307,413 | 12/1981 | Takeuchi et al. | 358/31 |
| 4,389,665 | 6/1983 | Nagao et al. | 358/31 X |
| 4,513,311 | 4/1985 | Hirai et al. | 358/31 X |
| 4,570,177 | 2/1986 | Kondo et al. | 358/31 |

FOREIGN PATENT DOCUMENTS

| | | | |
|---|---|---|---|
| 0150687 | 11/1980 | Japan | 358/31 |
| 2067872 | 7/1981 | United Kingdom | 358/31 |

OTHER PUBLICATIONS

John Rossi, "Digital TV Comb Filter with Adaptive Features", Conference & Proceedings of the Conference on Video and Data, Birmingham, England (Jul. 20-22, 1976), pp. 267-282.

"Comb Filter Improvement with Spurious Chroma Deletion"—Kaiser; pp. 1-5, Jan. 1977 SMPTE Journal (vol. 86, No. 1).

*Primary Examiner*—James J. Groody
*Assistant Examiner*—Michael P. Dunnam
*Attorney, Agent, or Firm*—Eugene M. Whitacre; Paul J. Rasmussen; William H. Meagher

[57] ABSTRACT

Control signal generator is responsive to the output of a pair of correlation indicators. One correlation indicator provides an indication of the presence or absence of correlation between high frequency components derived without difference in delay from the respective luminance and chrominance outputs of a color TV receiver's comb filter system. The other correlation indicator provides an indication of the presence or absence of correlation between high frequency components derived with a difference in delay from the respective comb filter outputs, the delay difference corresponding to a quarter period at the nominal color subcarrier frequency. Control signal is developed in response to a correlation indication by either or both of the indicators. The luminance output of the comb filter is subjected to high frequency component removal during control signal development.

7 Claims, 1 Drawing Figure

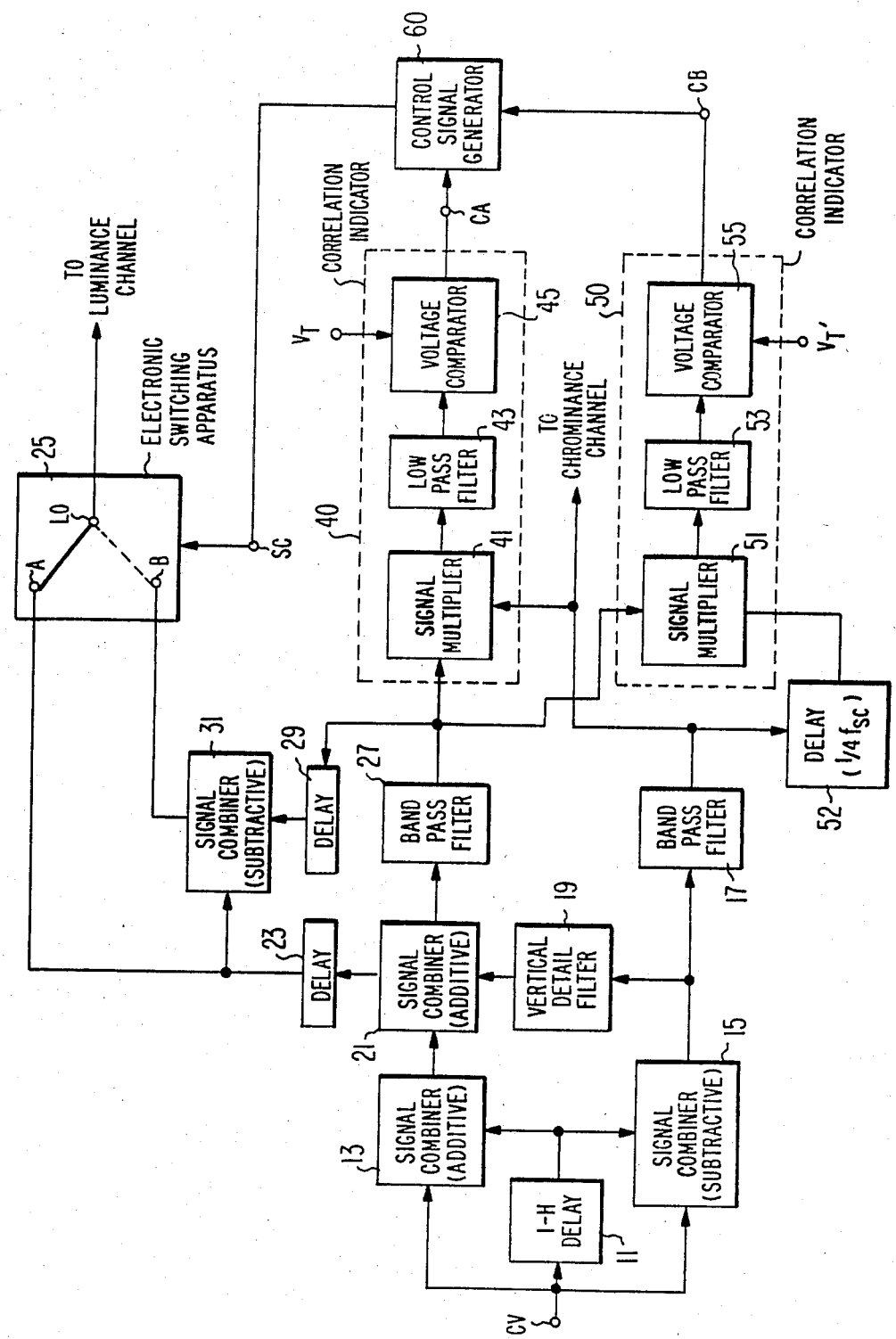

HANGING DOT REDUCTION SYSTEM

This invention relates generally to composite video signal processing apparatus of the type employing comb filter circuits to effect the separation of the luminance and chrominance components of the composite signal, and particularly to a system for use therein to effect reduction of picture disturbances of the so-called "hanging dot" type that may be associated with the comb filter operation.

The success of the separation function performed by typical forms of comb filters in color television receivers is dependent upon the existence of redundancy of picture information in adjacent regions of successive scan lines. For picture areas where a transition in the direction of field scanning (hereinafter referred to as a vertical transition) occurs, the difference in picture information in adjacent regions of sucessive scan lines can result in imperfect performance of the separation function, with one consequence being the appearance of a chrominance component in the luminance signal output of the comb filter. If not removed, the interloping chrominance component will be reproduced as "hanging dots", i.e., as an undesirable array of dots extending across the region of the vertical transition in the displayed picture.

U.S. Pat. No. 4,241,363 illustrates one prior art approach to the detection of "hanging dot" occurrences, wherein the indication of such an occurrence is developed by a signal multiplier responsive to chrominance signal and high frequency luminance signal outputs of comb filter apparatus.

It is herein recognized that the signal multiplier apparatus of the aforesaid patent serves as a correlation indicator, relying upon a recognition of correlation between signal components in the respective outputs of the comb filter apparatus to identify "hanging dot" occurrences. For certain types of vertical transitions, such as transitions between colored and uncolored areas, the disclosed apparatus of said patent can provide a reliable identification of "hanging dot" occurrences.

However, it is additionally recognized herein that the disclosed apparatus of the aforesaid patent fails in its role of identification of "hanging dot" occurrences in instances of certain vertical transitions between areas of different colors. For example, for certain transitions of this type, the interloping chrominance component appearing in the high frequency luminance signal output of the comb filter apparatus bears a substantially quadrature phase relationship to the chrominance component appearing in the chrominance signal output of the comb filter apparatus. In such an instance, the signal multiplier of the aforesaid patent fails to develop an indication of a "hanging dot" occurrence, and, as a result, an undesired dot array will be subject to display in the vertical transition region.

Pursuant to the principles of the present invention, the identification of "hanging dot" occurrences is carried out by apparatus employing a pair of correlation indicators: (a) one correlation indicator being responsive to inputs comprising chrominance signal and high frequency luminance outputs derived without difference in delay from the comb filter apparatus, and (b) another correlation indicator being responsive to inputs comprising chrominance signal and high frequency luminance outputs derived with a relative delay difference from the comb filter apparatus, the delay difference substantially corresponding to one-quarter of the length of a period at the nominal subcarrier frequency associated with the chrominance component. Through reliance upon the development of an output by either (or both) of the correlation indicator pair to identify "hanging dot" occurrences, a more reliable "hanging dot" identifier is obtained, which avoids the quadrature relationship failure of the prior art apparatus described above. During periods of "hanging dot" identification, the luminance signal output of the comb filter is subjected to appropriate modification (e.g., high frequency component deletion) to preclude "hanging dot" display.

In the accompanying drawing:

The sole FIGURE illustrates a portion of a color television receiver employing comb filter apparatus incorporating a "hanging dot" reduction system in accordance with an embodiment of the present invention.

In the illustrated color TV receiver apparatus, composite video signals (inclusive of a luminance component, and of a chrominance component comprising sidebands developed by the modulation of a color subcarrier $f_{sc}$) appear at a composite video signal input terminal CV and are supplied to the input of a 1−H delay line 11. The delayed signal output of delay line 11 is additively combined with signals derived directly from terminal CV in signal combiner 13, and also is subtractively combined with signals derived directly from terminal CV in signal combiner 15.

The combination of delay line 11 and the subtractive signal combiner 15 forms a first comb filter having a frequency response characteristic exhibiting a succession of response peaks at odd multiples of half the line frequency of the composite signals (interspersed with response minima at even multiples of half the line frequency). High frequency components of the output of the first comb filter, falling within the band of frequencies occupied by the chrominance component, are selectively passed by a bandpass filter 17 coupled to the output of signal combiner 15 to form a combed chrominance signal suitable for delivery to the receiver's chrominance channel.

The combination of delay line 11 and the additive signal combiner 13 forms a second comb filter having a frequency response characteristic exhibiting a succession of response peaks at even multiples of half the line frequency (interspersed with response minima at odd multiples of half the line frequency). The output of signal combiner 13 constitutes a combed luminance signal, substantially freed of chrominance component accompaniment, but also undesirably stripped of low frequency components representative of vertical detail. Restoration of vertical detail information to the combed luminance signal is effected by an additional signal combiner 21, which additively combines the output of signal combiner 13 with the output of a vertical detail filter 19. Vertical detail filter 19 is responsive to the output of the first comb filter, accepting the output of signal combiner 15 and selectively passing low frequency components thereof falling within a frequency band below that occupied by the chrominance component.

The output of signal combiner 21 is normally employed as the signal input to the receiver's luminance channel. For this purpose, the output of signal combiner 21 is coupled via a signal delay device 23 (with a compensating function to be subsequently explained) to signal input terminal A of electronic switching apparatus 25. In a first of the two switching states of apparatus 25, which state is normally existent (and is represented in the drawing by the solid-line switch blade showing), the switching apparatus output terminal LO (which is coupled to deliver signals to the luminance channel input) is linked to input terminal A. In the second of the switching states of apparatus 25, however, the link between terminals A and LO is disrupted, and output terminal LO is instead linked to signal input terminal B of the switching apparatus 25 (as represented in the drawing by the interrupted-line switch blade showing).

In the second switching state of apparatus 25, the signal delivered to the receiver's luminance channel corresponds to the output of signal combiner 21, subject, however, to removal of its high frequency components. For production of such a reduced-bandwidth signal, the illustrated apparatus includes a subtractive signal combiner 31, responsive to the output of signal combiner 21 (supplied therefrom via delay device 23) and to the output of a bandpass filter 27 (supplied therefrom via an additional delay device 29). Bandpass filter 27 is responsive to the output of signal combiner 21, and illustratively has a passband substantially identical with that of bandpass filter 17. The delay imparted to signals by delay device 23 exceeds the delay imparted by delay device 29 by an amount comparable to the signal delay introduced by bandpass filter 27, so as to align the timing of the high frequency components of the signal inputs to combiner 31 in a manner ensuring high frequency component cancellation therein.

Control of the switching of apparatus 25 between its respective switching states is effected by a switching control signal delivered to the control input terminal SC of apparatus 25. The switching control signal is developed by a control signal generator 60, responsive to the outputs of a pair of correlation indicators, 40 and 50, now to be described.

Correlation indicator 40 is illustrated as comprising a signal multiplier 41, a low pass filter 43, and a voltage comparator 45. Signal multiplier 41 functions to multiply the high frequency components of the respective oututs of the first and second comb filters. The respective multiplier inputs are derived (without difference in delay) from the outputs of bandpass filters 17 and 27. The products of multiplication developed by multiplier 41 are filtered by lowpass filter 43 to develop a filtered multiplier output signal, which is subject to comparison with a threshold voltage supplied from terminal $V_T$ in voltage comparator 45. A hanging dot occurrence indication is provided at the output terminal CA of voltage comparator 45 whenever the level of the filtered multiplier output signal exceeds the threshold voltage input from terminal $V_T$.

The configuration of correlation indicator 50 is similar to that of correlation indicator 40, incorporating signal multiplier 52, low pass filter 53 and voltage comparator 55. The inputs to multiplier 51, like the inputs to multiplier 41, comprise the respective outputs of the bandpass filters 17 and 27. However, unlike the signal delivery to multiplier 41, the respective signals are delivered to multiplier 51 with a difference in delay caused by the interposition of delay device 52 in the signal path between bandpass filter 17 and signal multiplier 51. The amount of delay imparted by delay device 52 corresponds to 90° at the nominal subcarrier frequency of the chrominance component (i.e., a quarter period at $f_{sc}$). The products of multiplication developed by multiplier 51 are filtered by lowpass filter 53 to develop a filtered multiplier output signal, which is subject to comparison with a threshold voltage from terminal $V_T'$ in voltage comparator 55. A hanging dot occurrence indication is provided at output terminal CB of voltage comparator 55 whenever the level of the filtered multiplier output signal exceeds the threshold voltage input from terminal $V_T'$.

Control signal generator 60, responsive to the voltages at terminals CA and CB, develops a control signal at control input terminal SC which (a) swings to a level establishing the second switching state for apparatus 25 (linking switch input terminal B to switch output terminal LO), whenever a hanging dot occurrence indication appears at either (or both) of terminals CA and CB; and (b) remains at a level retaining the first switching state for apparatus 25 (linking switch input terminal A to switch output terminal LO) during periods of absence of a hanging dot occurrence indication from both of the terminals CA, CB.

The magnitude of the delay imparted by delay device 23 is selected to substantially match the delay associated with control signal development so as to ensure appropriate timing of the switching action of apparatus 25 relative to the timing of the hanging dot occurrences in the signals being delivered to apparatus 25.

In operation of the illustrated system, use of the pair of correlation indicators 40,50 avoids the quadrature relationship failure previously referred to herein. Whenever a vertical transition occurrence results in appearances of a chrominance component in outputs of both of the first and second comb filters, the ability to recognize such joint appearances is rendered independent of the phase relationship between the respective components. Where the phase relationship is an in-phase (or 180° out of phase) relationship, the joint appearance is recognized by correlation indicator 40. Where the phase relationship is a quadrature relationship, the joint appearance is recognized by correlation indicator 50. For intermediate phase relationships, the joint appeance will be recognized by one or the other, or both, of the correlation indicators.

The provision of the voltage comparators (45,55) in the respective correlation indicators is for the purpose of associating a thresholding action with the operation of the hanging dot reduction system. When the magnitude of the interloping chrominance component is quite small, the visibility of the resulting dot pattern will be sufficiently insignificant as to not warrant a suppression action, wherefore alteration of the switching state of apparatus 25 is not desired. Use of such a thresholding action will affect the operation of the correlation indicators 40,50 for the aforementioned cases of intermediate phase relationships. For example, for an intermediate phase relationship close to a quadrature relationship, the result may be an above-threshold indication only from the correlation indicator 50, whereas for an intermediate phase relationship further from a quadrature relationship, the result may be of an above-threshold indication from both of the correlation indicators 40 and 50. However, this is of no adverse consequence, since the operation of generator 60 is the same in the presence of an indication by both correlation indicators as it is in the presence of an indication by only one of the correlation indicators.

The principles of the present invention are applicable to solution of the hanging dot problem in both receivers of the type employing analog signal processing circuits and receivers of the type employing digital signal processing circuits. The form of correlation indicator illustrated herein, employing a signal multiplier, is readily implemented in receivers of the analog signal processing type. The aforementioned patent provides circuit details for one example of such implementation. The illustrated form of correlation indicator may also be implemented in receivers of the digital signal processing type, using well known techniques for digital signal multiplication and filtering. However, a less expensive digital embodiment of the present invention may be realized with use of a novel form of correlator, which is described in a copending U.S. patent application Ser. No. 724,555, filed Apr. 18, 1985, entitled "Digital Correlation Indicator and Hanging Dot Reduction System Employing Same" and concurrently filed herewith, which description is herein incorporated by reference.

What is claimed is:

1. In a system for processing composite color television signals inclusive of a luminance signal component and a chrominance signal component comprising modulated subcarrier waves, said system including comb filter apparatus comprising a 1−H delay line having an input to which undelayed composite signals are applied and having an output at which delayed composite signals appear, means for subtractively combining said undelayed and said delayed composite signals to form a first comb filtered signal output, and means for additively combining said undelayed and delayed composite signals to form a second comb filtered signal output; apparatus comprising:

a first filter responsive to said first comb filtered signal output, and removing low frequency components therefrom;

chrominance signal component utilization means responsive to an output of said first filter;

a second filter responsive to said second comb filtered signal output, and removing low frequency components therefrom;

a first correlation indicator, responsive to the respective outputs of said first and second filters, for developing a first indication signal in the presence of correlation between a relatively undelayed signal derived from the output of one of said first and second filters and a relatively delayed signal derived from the output of the other of said first and second filters; the difference in delay between said relatively undelayed and relatively delayed signals being substantially equal to a quarter period at the nominal frequency of said subcarrier waves;

a second correlation indicator, responsive to the respective outputs of said first and second filters, for developing a second indication signal in the presence of correlation between respective signals derived without difference in delay from the outputs of said first and second filters;

luminance signal component utilization means;

means, responsive to the outputs of said first and second correlation indicators, for developing a control signal in response to the presence of either or both of said first and second indication signals; and controlled means, responsive to said second comb filtered signal output and to said control signal, for delivering a modified version of said second comb filtered signal output to said luminance signal component utilization means during periods of development of said control signal, and for delivering an unmodified version of said second comb filtered signal output to said luminance signal component utilization means in the absence of development of said control signal.

2. Apparatus in accordance with claim 1 including means for subjecting said second comb filtered signal output to high frequency component removal to develop said modified version of said second comb filtered signal output.

3. Apparatus in accordance with claim 2 wherein said subjecting means comprises means for subtractively combining the output of said second filter with said second comb filtered signal output.

4. Apparatus in accordance with claim 3 also including means for selectively passing low frequency components of said first comb filtered signal output, and wherein the output of said passing means is delivered to said luminance signal component utilization means independent of the operating condition of said control signal developing means.

5. In a system for processing composite color television signals inclusive of a luminance signal component and a chrominance signal component comprising modulated subcarrier waves, said system including comb filter apparatus for developing a first comb filtered signal output representing composite signals subjected to a first comb filter characteristic exhibiting a plurality of response peaks at odd multiples of half the line frequency of said composite signals, and a second comb filtered signal output representing composite signals subjected to a second comb filter characteristic exhibiting a plurality of response peaks at even multiples of half said line frequency; apparatus comprising:

chrominance signal component utilization means responsive to high frequency components of said first comb filtered signal output;

first correlation indicator means, responsive to high frequency components of the respective first and second comb filtered signal outputs, for developing a first indication signal in the presence of correlation between a relatively undelayed high frequency signal derived from one of said first and second comb filtered signal outputs and a relatively delayed high frequency signal derived from the other of said first and second comb filtered signal outputs; the difference in delay between said relatively undelayed and relatively delayed signals being substantially equal to a quarter period at the nominal subcarrier frequency of said chrominance component;

second correlation indicator means, responsive to high frequency components of the respective first and second comb filtered signal outputs, for developing a second indication signal in the presence of correlation between respective high frequency signals derived without difference in delay from said first and second comb filtered signal outputs;

luminance signal component utilization means;

means, responsive to the outputs of said first and second correlation indicator means, for developing a control signal in response to the presence of either or both of said first and second indication signals; and controlled means, responsive to said second comb filtered signal output and to said control signal, for delivering a modified version of said second comb filtered signal output to said luminance signal component utilization means during periods of development of said control signal, and for delivering an unmodified version of said second comb filtered signal output to said luminance signal component utilization means in the absence of development of said control signal.

6. Apparatus in accordance with claim 5 also including means for selectively passing low frequency components of said first comb filtered signal output, and wherein the output of said passing means is delivered to said luminance signal component utilization means in the presence of, as well as in the absence of, control signal development.

7. Apparatus in accordance with claim 6 wherein said modified version of said second comb filtered signal is substantially free of high frequency components.

* * * * *